(No Model.)

J. G. AVERY.
ANTIFRICTION BEARING

No. 502,025. Patented July 25, 1893.

Witnesses
A. J. Schwartz
Geo. W. Whitney

Inventor
John G. Avery
by R. L. Ewin
Attorney

UNITED STATES PATENT OFFICE.

JOHN G. AVERY, OF SPENCER, MASSACHUSETTS.

ANTIFRICTION-BEARING.

SPECIFICATION forming part of Letters Patent No. 502,025, dated July 25, 1893.

Application filed August 5, 1892. Serial No. 442,244. (No model.)

*To all whom it may concern:*

Be it known that I, JOHN G. AVERY, a citizen of the United States, and a resident of Spencer, in the State of Massachusetts, have invented a new and useful Improvement in Antifriction-Bearings, of which the following is a specification.

This invention relates to anti-friction bearings of those kinds set forth in my previous specifications forming part of United States Letters Patent No. 267,991, dated November 28, 1882, and No. 287,215, dated October 23, 1883. Heretofore such bearings have been rendered serviceable by making the rollers themselves of hardened steel and hardening the concentric surfaces between which they rotate and revolve, as set forth in said previous specifications. So hardening the parts, and afterward fitting them involves great expense, and materially limits the use of the bearings in question.

The present invention consists in anti-friction rollers, the bodies of which are of a certain non-metallic material hereinafter described and which are provided in a peculiar manner with metallic tie-rods whereby hardened surfaces to coact with the rollers are rendered unnecessary, and the bearings are at the same time rendered noiseless and less liable to heat; the employment of such non-metallic rollers being rendered practicable even in bearings for heavy work by such metallic tie-rods, which prevent elongation of the rollers under strain.

A sheet of drawings accompanies this specification as part thereof.

Figure 1:
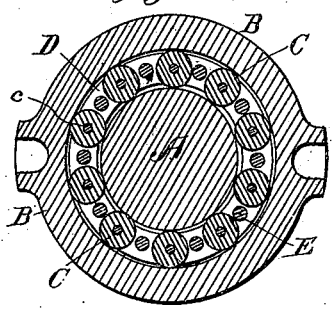
Figure 2:
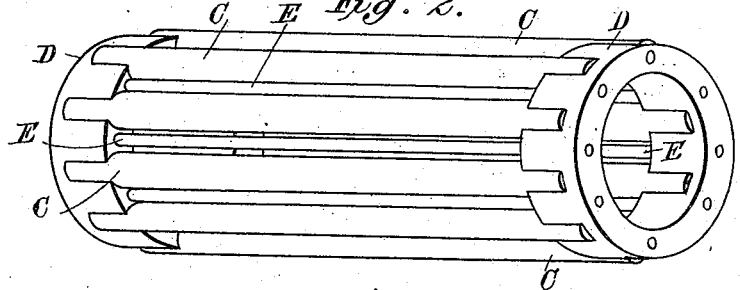
Figure 3:
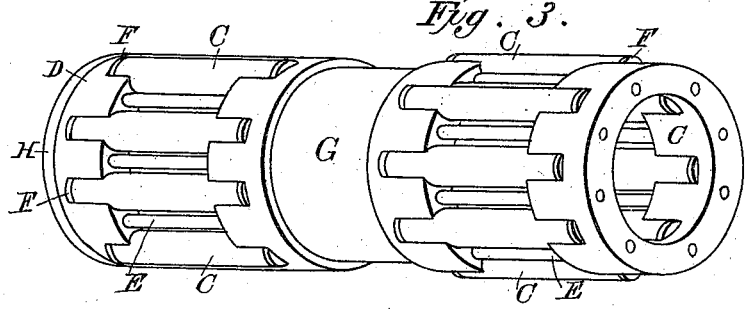
Figure 4:
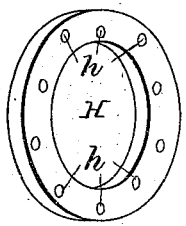

Figure 1 of these drawings represents a cross section through a bearing for line shafting illustrating this invention. Fig. 2 is a perspective view of its "long-roll shell," the pattern of which is suitable for most bearings. Fig. 3 is a perspective view of a long-roll shell of the pattern set forth in said Patent No. 287,215. Fig. 4 is a perspective view of a washer such as I use in connection with either of said long-roll shells, and Figs. 5 and 6 are respectively longitudinal and cross-sections showing one of the improved rollers in detail.

Like letters of reference indicate corresponding parts in all the figures.

In the anti-friction bearing for line shafting represented by Figs. 1 and 2, and in any other anti-friction bearing to which this invention is applicable, I provide the shaft A, or its equivalent, and the non rotary outer shell, or box, B, with concentric opposing surfaces which are perfectly smooth and true but need be no harder than cast-iron or brass; and between these surfaces I interpose smooth cylindrical journalless rollers C, of the peculiar construction hereinafter described, having bodies and outer surfaces of the material known as "hard fiber." Other species of chemically treated or parchmentized fibrous material offering like resistance to compression and disintegration are considered equivalents of said "hard fiber," as for example the horny material known as "leatheroid." All such materials are intended to be included under the term "hard fiber" as hereinafter employed. In use, such hard-fiber rollers are found to be noiseless and absolutely frictionless, and appear to be well suited for high speeds, and for general use in anti-friction bearings. The rollers may be united in a cylindrical "shell" of the pattern represented in Figs. 1 and 2 and set forth in said Patent No. 267,991, by means of a pair of end-rings D together with longitudinal rods E equal in number to the rollers, all of suitable metal; said end-rings being drilled to receive and expose the ends of the journalless rollers as shown in Fig. 2, and to receive tightly fitted shouldered ends on the rods. Or rollers C of smaller diameter in proportion to the required length of bearing may preferably be united together with like end rings D and rods E in a shell of the pattern represented by Fig. 3 and set forth in said Patent No. 287,215, with or without small disk-shaped washers F, of oil-soaked leather or the like, at the ends of each roller; the distinguishing feature of this long-roll shell, Fig. 3, being a waist-piece G, drilled to receive and expose the inner ends of two series of journalless rollers as their outer ends are received and exposed by said rings D. In connection with either of said long-roll shells, washers H, of the pattern represented by Fig. 4, are preferably interposed between the ends of said shells and those of the outer shells or boxes, to reduce the friction between the slowly revolving inner shell and the outer shell at these points. I propose making such washers Fig. 4 of said hard-fiber provided with lubricating fillings $h$ of black lead in holes, drilled irregularly or near the inner edge and near the outer edge alternately, perpendicular to the faces of the washer, as set forth in said Patent No. 287,215. Said waist-piece G, Fig. 3 and the end-rings D, may also be made of hard fiber instead of metal, because of the greater lightness of the former in proportion to its strength; but these secondary uses of hard fiber are not considered material, and are not essential to my present invention.

Figure 5:
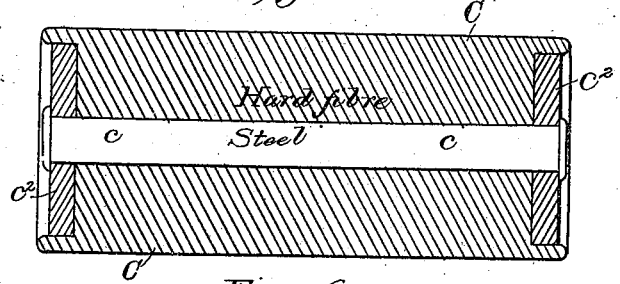
Figure 6:
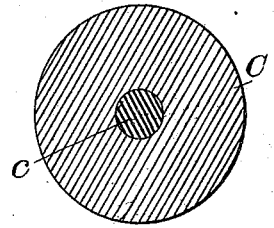

Each of the improved rollers C is of the peculiar construction represented by Figs. 5 and 6, that is to say, each roller is provided with an axial metallic rod $c$, put in tension, and riveted at both ends to metallic end washers $c^2$, the latter being somewhat less in diameter than the roller, and preferably let into its ends as shown in Fig. 5 so as not to come in contact with the washers F, or with the end rings D or end rings and waist piece of the revolving shell. Such axial tie-rods prevent the elongation of the rollers, and adapt them for use under heavy loads as well as for lighter work.

In the axle boxes of railway cars, and like bearings where there is considerable end-thrust, ordinary or improved ball bearings may be employed at the ends of the long-roll shell; and other like modifications will suggest themselves to those skilled in the art.

Having thus described the said improvement, I claim as my invention and desire to patent under this specification—

1. An improved anti-friction bearing having journalless cylindrical rollers the bodies and outer surfaces of which are of hard fiber, each roller being provided with an axial metallic rod under strain riveted to end washers of less diameter than the roller, and concentric coacting surfaces of unhardened metal, as cast iron, substantially as hereinbefore specified.

2. In an anti-friction bearing for heavy work, anti-friction rollers of hard-fiber, each provided with an axial metallic rod under strain riveted to end-washers of less diameter than the roller, substantially as hereinbefore specified.

JOHN G. AVERY.

Witnesses:
JOHN M. NEWTON,
JOHN E. GODDARD.